(12) United States Patent
Swenson et al.

(10) Patent No.: US 8,464,093 B1
(45) Date of Patent: Jun. 11, 2013

(54) MEMORY ARRAY ERROR CORRECTION

(75) Inventors: Erik R. Swenson, San Jose, CA (US); Brian C. Edem, Saratoga, CA (US); Thuan D. Nguyen, Thousand Oaks, CA (US); Khoi D. Vu, Valley Village, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 942 days.

(21) Appl. No.: 10/934,928

(22) Filed: Sep. 3, 2004

(51) Int. Cl.
*G06F 11/10* (2006.01)

(52) U.S. Cl.
USPC .......................................... 714/5.1; 714/755

(58) Field of Classification Search
USPC ...................................... 714/5, 755
See application file for complete search history.

(56) References Cited

U.S. PATENT DOCUMENTS

| | | | |
|---|---|---|---|
| 4,277,844 A | | 7/1981 | Hancock et al. ................ 371/38 |
| 4,335,458 A | * | 6/1982 | Krol ............................ 714/763 |
| 4,464,747 A | * | 8/1984 | Groudan et al. ............. 714/804 |
| 4,617,664 A | * | 10/1986 | Aichelmann et al. ......... 714/758 |
| 4,775,978 A | * | 10/1988 | Hartness ..................... 714/770 |
| 4,958,350 A | * | 9/1990 | Worley et al. ............... 714/755 |
| 5,056,095 A | * | 10/1991 | Horiguchi et al. ........... 714/765 |
| 5,058,115 A | * | 10/1991 | Blake et al. .................. 714/767 |
| 5,251,219 A | | 10/1993 | Babb ........................... 371/37.4 |
| 5,257,391 A | * | 10/1993 | DuLac et al. ................. 710/10 |
| 5,453,998 A | * | 9/1995 | Dang ........................... 714/805 |
| 5,463,644 A | * | 10/1995 | Rodi et al. ................... 714/766 |
| 5,680,579 A | * | 10/1997 | Young et al. ................. 711/157 |
| 6,034,957 A | | 3/2000 | Haddock et al. |
| 6,122,754 A | * | 9/2000 | Litwin et al. ..................... 714/4 |
| 6,295,299 B1 | | 9/2001 | Haddock et al. |
| 6,658,590 B1 | * | 12/2003 | Sicola et al. ..................... 714/6 |
| 7,028,213 B2 | * | 4/2006 | Majni et al. ..................... 714/5 |
| 7,386,663 B2 | * | 6/2008 | Cousins ........................ 711/114 |
| 2003/0061558 A1 | | 3/2003 | Fackenthal et al. ............ 714/755 |

OTHER PUBLICATIONS

Van Ess, D., *A Circular FIFO, PSoC Style*, Cypress Microsystems, Application Note AN2036, Rev. B, pp. 1-5, Jun. 21, 2002.
Network Working Group, *RFC 1071—Computing the Internet Checksum*, Sep. 1988, available at: http://www.faqs.org/rfcs/rfc1071.html.
Network Working Group, *RFC 1141—Incremental Updating of the Internet Checksum*, Jan. 1990, available at: http://www.faqs.org/rfcs/rfc1141.html.
Network Working Group, *RFC 1624—Computation of the Internet Checksum via Incremental Update*, May 1994, available at: http://www.faqs.org/rfcs/rfc1624.html.
Netlogic Microsystems, Product Brief NSE5000GLQ, Copyright 2004, available at: http://www.netlogicmicro.com/datasheets/nse5000glq.html.
Zhang, Z., *Recovery of Memory and Process in DSM Systems: HA Issue #1*, Hewlett-Packard Co. HPL-2001-76, Mar. 30, 2001.
"On-Chip TEC-QED ECC for Ultra-Large, Single-Chip Memory Systems," Fahad Alzahrani et al.; Computer Design: VLSI in Computers and Processors, 1994. ICCD '94 Proceedings, IEEE International Conference on Cambridge, MA, Oct. 12, 1994, Los Alamitos, CA, IEEE Comput. Soc., Oct. 10, 1994, pp. 132-137.
International Search Report, PCT/US2005/031939, dated Jan. 11, 2006.
Patterson, A Case for Redundant Arrays of Inexpensive Disks (RAID), ACM, 1988.

* cited by examiner

*Primary Examiner* — Stephen M Baker
(74) *Attorney, Agent, or Firm* — Blakely, Sokoloff, Taylor & Zafman, LLP

(57) ABSTRACT

A memory array comprises N+1 memory elements. N memory elements store data and one or more error check bits respectively derived from the stored data. A separate N+1 memory element stores parity bits generated from the data stored in the N memory elements. These parity bits are stored in. To recover from data errors, data in each N memory element are first checked using their respective error check bits. If faulty data are detected in one of the N memory elements, an exclusive-or operation is performed involving data in the remaining N−1 memory elements and parity bits in the N+1 memory element. This recovers the faulty data in the one memory element.

13 Claims, 3 Drawing Sheets

MEMORY ARRAY ERROR CORRECTION

TECHNICAL FIELD

The invention relates generally to digital memory, and more specifically, to error correction techniques used in arrays of digital memories.

BACKGROUND

Memory failures in digital systems can take many forms, but they all have one thing in common. They can result in catastrophic system failure, wreaking havoc in infrastructure such as telecommunications, information processing, traffic control, etc. Because of the potential serious consequences of memory failure, techniques have been developed to correct errors that develop in digital memory.

In some prior art memories, memory failures are recovered using parity checking or ECC (error correction code or error checking and correction) algorithms. With any algorithm, it is important that the algorithm be robust in the sense that it can recover from different type of memory errors. For example, with one type of error, memory I/O (input/output) ports can fail, corrupting an entire memory device and causing the loss of large amounts of data. Another type of memory failure may involve a single bit error, corrupting only one byte of data. Despite the disparity in the amount of data corrupted, either type of memory failure can cause devastating results in the system relying on the memory. Thus, the importance of robustness in the error correction technique used by a system.

Of known error handling techniques, parity checking is one of the simplest. It involves appending one or more parity bits to a data word. The parity bits are typically generated by performing an exclusive OR operation over the bits of a data word. In some parity checking implementations, a single parity bit is computed for every data byte by XORing the bits in the data byte. In other implementations, parity words are generated by performing a bitwise XOR operation on two or more data words. The parity word has the same bit width as the data words, and each bit in the parity word corresponds to data bits have the same position in the data words. Single-bit parity checking alone can only detect certain types of errors, i.e. single-bit error and odd numbers of bit errors. This limits the robustness and usefulness of simple parity checking in some memory applications.

Many ECC techniques can detect multiple bit errors, but can only correct a small number of bit errors. Often used with computer memory, ECC involves special circuitry and/or software to test data and assure their accuracy. Error control methods can be as simple as performing a cyclic redundancy check (CRC) in order to detect errors or adding multiple parity bits to both detect and correct errors. Double errors can be detected with more sophisticated techniques, such as Hamming code. In some fault tolerant memories, SEC/DED (Single Error Correct/Double Error Detect) ECC is used. However, when catastrophic memory failures occur, many known ECC schemes are generally ineffective in correcting the failures. Accordingly, there is a need for an improved memory error correction scheme.

SUMMARY

It is an advantage of the invention to provide an improved error correction scheme that allows many types of detectable errors in a memory array to be fully recovered.

In accordance with an exemplary embodiment of the invention, a memory array comprises N+1 memory elements. N memory elements store data and error check bits derived from the data. Parity bits are generated from the data stored in the N memory elements. These parity bits are stored in a separate N+1th memory element. To recover from data errors, data stored in each of the N memory elements are first checked using their respective error check bits. If faulty data are detected in one of the N memory elements, an exclusive-or operation is performed involving data in the remaining N−1 memory elements and parity bits in the N+1th memory element. This restores the faulty data.

Method counterparts to this embodiment are also provided. Other embodiments, systems, methods, features and advantages of the invention will be or will become apparent to one with skill in the art upon examination of the following figures and detailed description. It is intended that all such additional embodiments, systems, methods, features and advantages be included within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
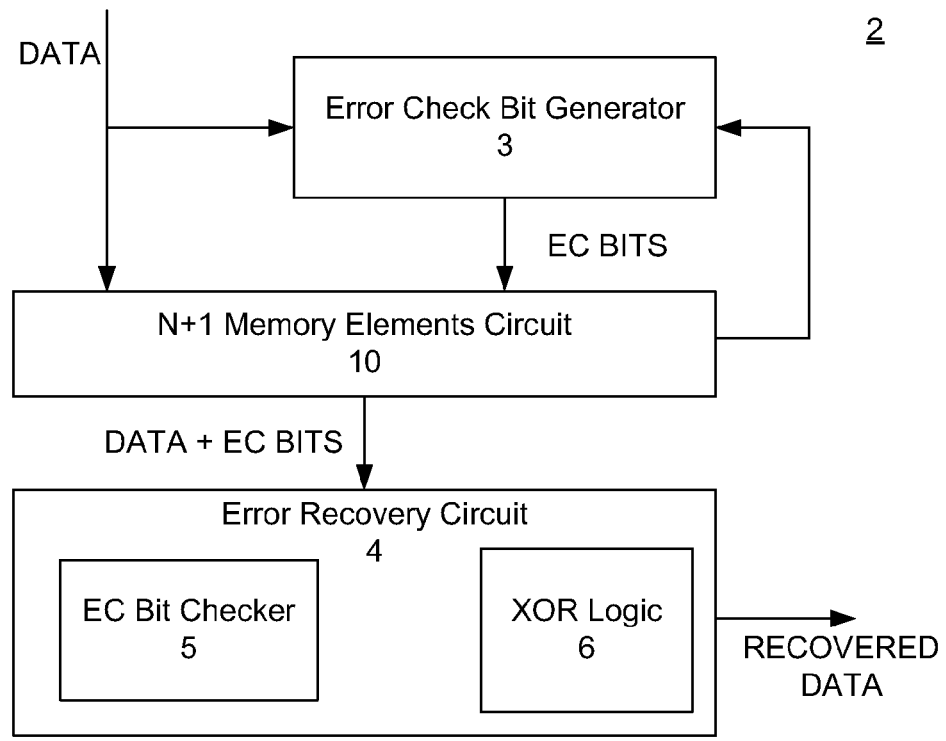
FIG. 1 is a conceptual block diagram of a memory circuit in accordance with an exemplary embodiment of the present invention.

Turning now to the drawings, and in particular to FIG. 1, there is illustrated a memory circuit 2 in accordance with an exemplary embodiment of the present invention. The memory circuit 2 includes an error check (EC) bit generator 3, an array of N+1 memory elements 10 (where N is an integer greater than one), and an error recovery circuit 4. The error recovery circuit 4 includes an EC bit checker 5 and exclusive-or (XOR) logic 6.

Digitized data input to the circuit 2 are provided to the EC bit generator 3 and the memory element array 10. The data are represented as vectors of bits. The bit length of the vectors is a matter of design choice, and may be any suitable value. The EC bit generator 3 generates EC bits in response to the incoming data. The EC bit generator 3 can use any suitable error correction or detection algorithm to produce the EC bits, such as an industry standard error correction code (ECC), a parity calculation to produce one or more parity bits, a checksum calculation, a cyclic redundancy check (CRC), or any suitable combination of the foregoing. The ECC used can be a Hamming code, Reed-Solomon code, Reed-Muller code, Binary Golay code, or the like. The CRC can be based on an industry standard such as CRC-16 promulgated by the ITU-TS (CCITT).

The data and their corresponding EC bits are stored in the memory element array 10. The array 10 includes N memory elements for storing N data segments and N sets of corresponding EC bits, and one redundant memory element for storing one or more parity bits calculated from the data stored in the N memory elements. This is discussed in further detail below in connection with FIG. 2.

When data are read from the memory circuit 2, the data and their corresponding EC bits are retrieved from the array of N memory elements 10 and passed to the error recovery circuit 4. The EC bit checker 5 checks the EC bits from each memory element to detect bit errors in the stored data. If faulty data are detected in any of the memory elements 10, the bad memory elements are identified by the checker 5, and this information is passed to the XOR logic 6. The XOR logic 6 recovers the corrupted data of the identified memory element by performing a bitwise exclusive-or operation using the data in the remaining N−1 memory elements and the parity bits in the redundant memory element.

The EC bit checker 5 can use any suitable error detection or correction algorithm to detect one or more bit errors in each of the N memory elements, such as an industry standard error correction code (ECC), a parity calculation, a checksum calculation, a standard cyclic redundancy check (CRC) code, or any suitable combination of the foregoing. The algorithm used by the EC bit checker 5 needs to be compatible with the one used in the EC bit generator 3.

If the EC bit checker 5 uses an error correction algorithm, such as ECC, that is capable of correcting certain bit errors, the checker 5 can correct such bit errors and recover the faulty data without evoking the XOR logic 6.

The elements 3, 4, 5, 6 and 10 of the memory circuit 2 can be implemented using hardware, software or any suitable combination of hardware and software. The elements 3,4,5,6 and 10 are preferably implemented in hardware using one or more application specific integrated circuits (ASICs). The memory elements 10 are preferably solid-state memories, but can also be implemented using optical or magnetic storage devices.

Figure 2:
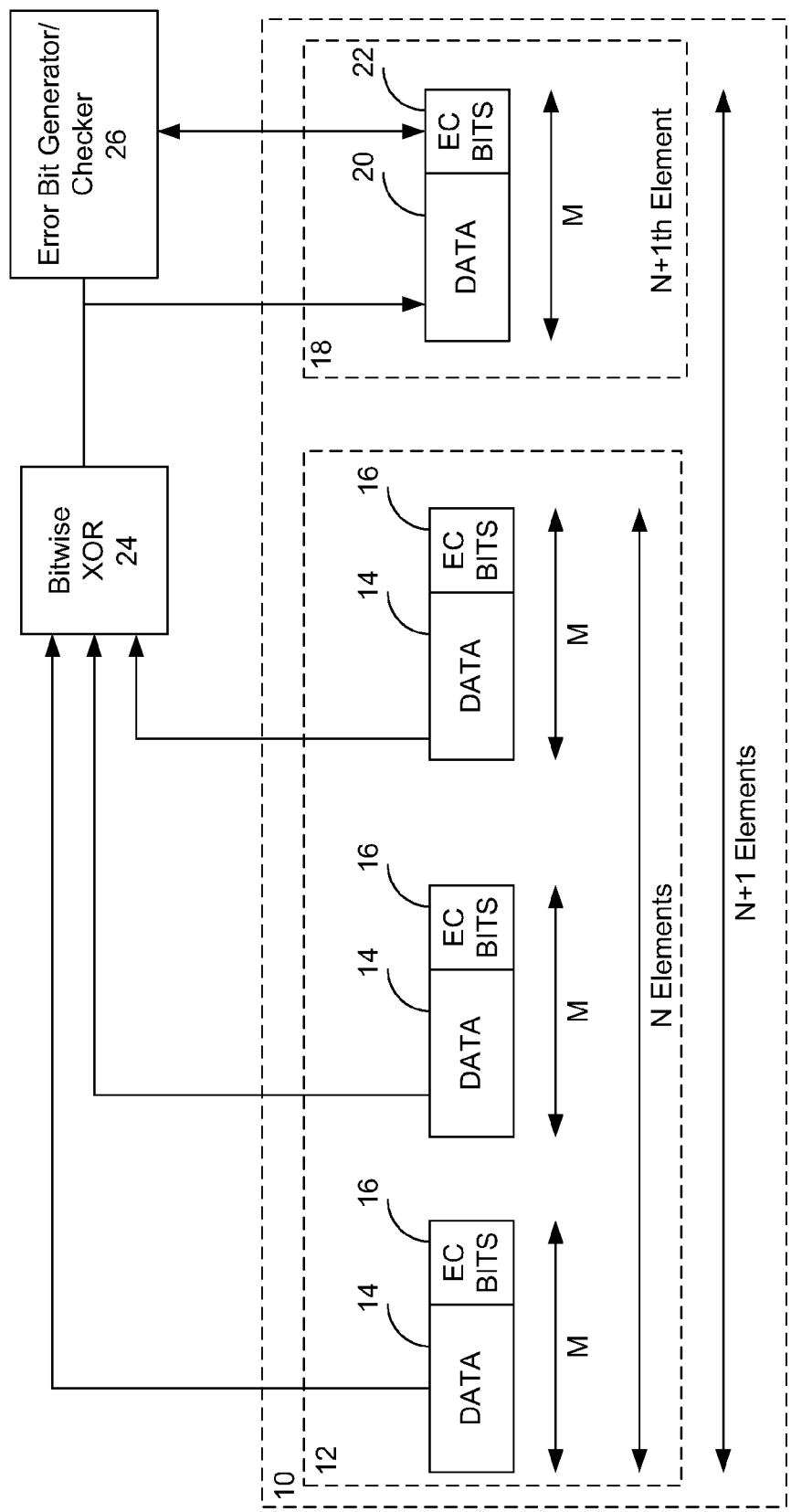
FIG. 2 is a detailed conceptual diagram of the array of N+1 memory elements shown in FIG. 1.

FIG. 2 is a detailed conceptual diagram of the array of N+1 memory elements 10 shown in FIG. 1. The scheme uses an array of N+1 independent memory elements 12,18. Data are written to the N elements 12 simultaneously as a wide word where the total width of the non-redundant portion of the array 10 is N*M. M is the bit width per memory element. The redundant memory element 18 also has width M. Thus, the total width of the array 10 is (N+1)*M bits. Of the M bits in each element, a number of bits are data 14, and the remaining bits are error check (EC) bits 16. These EC bits 16 can be ECC, parity, a checksum or the like.

Parity logic 24, such as logic circuitry or software, is provided for computing a bitwise XOR of the data 14 stored in each of the elements 12. For example, assume N3=4 and the four data elements 12 are identified as A, B, C, D. Also assume that the N+1 element 18 is identified as E. In this example, bit 0 of the data portion 20 of element 18 E[0] would be computed as: E[0]=A[0]^B[0]^C[0]^D[0]by parity logic 24. Similarly E[1] would be: E[1]=A[1]^B[1]^C[1]^D[1], and so on for the remaining bits in the data elements, where ^represents an XOR operation. The parity bits output by the parity logic 24 are stored in the data portion 20 of the redundant element 18.

An error check bit generator/checker 26 is provided for computing the EC bits 22 of the of the redundant memory element 18. The error check bit generator/checker 26 can also detect and/or correct bit errors in the parity data 20. The error check bit generator/checker 26 can use the same error detection or correction algorithms used by generator 3 and checker 5 discussed above in connection with FIG. 1.

Figure 3:
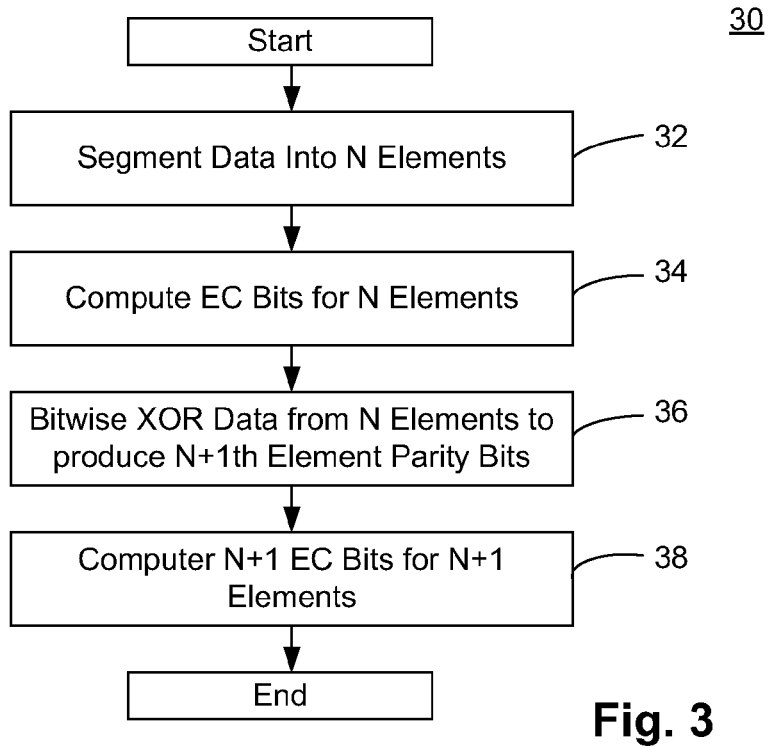
FIG. 3 is a flowchart showing a method of error coding a wide data word for storage in the memory circuit of FIG. 1.

FIG. 3 is a flowchart 30 showing a method of error check bit generation for a wide data word being stored in the memory array 10. When data are written into the array 10, they are first segmented into N elements (step 32). The EC bits 16 are then computed using a suitable error coding scheme, such as ECC, parity, checksum, or the like (step 34). The data 14 from each of the N elements 12 is XORed together (step 36) and this parity result is written into the data portion 20 of the redundant memory 18 along with its associated EC bits 22 (step 38).

Figure 4:
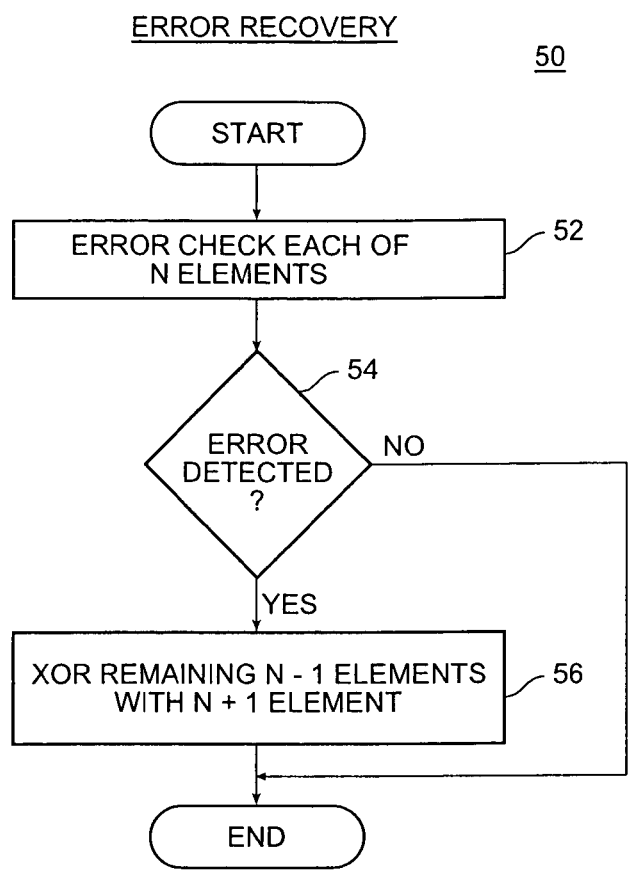
FIG. 4 is a flowchart showing a method error recovery using the memory circuit of FIG. 1.

FIG. 4 is a flowchart 50 showing a method of error recovery using the memory circuit 2. When the memory array 10 is read, each of the N elements 12 is individually checked by the EC bit checker 5 using the element's EC bits 16 (step 52). If any one of the N elements 12 has a bad check result, error recovery is undertaken by the XOR logic 6 (step 54). Recovery is accomplished by XORing the data from the remaining N−1 elements with the parity data from the redundant element 18 (step 56). This re-creates the data as originally stored in the faulty memory element.

Even if M is large, e.g. 32 bits, the scheme disclosed herein can recover the data with only an N+1 memory storage overhead. In addition, by using industry standard ECC algorithms, multiple single bit errors and I/O failures on the memory elements 12 can be corrected by the EC bit checker 5 without resorting to the parity data stored in the redundant memory element 18. Thus, the memory circuit 2 provides an extremely robust and relatively compact memory that is highly fault tolerant.

While various embodiments of the invention have been described, it will be apparent to those of ordinary skill in the art that many more embodiments and implementations are possible that are within the scope of this invention. For example, any combination of any of the systems or methods described in this disclosure are possible.

What is claimed is:

1. A memory array comprising:

N uniformly-sized memory elements, each of the N uniformly-sized memory elements having a memory of M bits for storing non-redundant data bits and one or more corresponding error check (EC) bits derived from the non-redundant data bits, wherein M is an integer and N is an integer greater than one, wherein M is greater than N, and wherein M is an integer multiple of N;

a first logic unit for computing parity bits by performing a first bitwise exclusive OR (XOR) operation on each of the non-redundant data bits stored in each of the N uniformly-sized memory elements;

an N+1th memory element having the memory of M bits for storing the parity bits computed by the first logic unit and for storing one or more EC bits corresponding to the parity bits computed by the first logic unit, the N+1th memory element being a redundant memory element;

a logic unit for computing the one or more EC bits corresponding to the parity bits computed by the first logic unit and for storing the one or more EC bits corresponding to the parity bits in a portion of the M bits of the N+1th memory element, wherein the logic unit is further operable to detect faulty bits in the parity bits stored in the portion of the M bits of the N+1th memory element using the one or more EC bits corresponding to the parity bits, wherein the logic unit is further operable to correct faulty bits in the parity bits;

a second logic unit for detecting faulty data bits stored in each of the N memory elements, the second logic unit is configured to operate on the corresponding EC bits stored in each of the N uniformly-sized memory elements to detect whether any one of the N uniformly-sized memory elements is storing faulty data in its data bits; and a third logic unit for recovering the faulty data detected by the second logic unit, wherein the third logic unit is configured to perform a second bitwise XOR operation on all the data bits from the remaining N−1 memory elements and with the parity bits stored in the N+1th memory element, the N−1 memory elements having fault free data bits in there corresponding M bits.

2. The memory array of claim 1 further comprises:
a logic unit for computing the corresponding one or more error check bits for each of the N memory elements from the corresponding data bits stored in each of the N memory elements.

3. The memory array of claim 1, wherein the corresponding one or more error check bits stored in each of the N memory elements represent at least one of: error correction code (ECC) bits, parity bits, checksum bits, cyclic redundancy check (CRC) bits, or any combination of the foregoing.

4. The memory array of claim 1, wherein the one or more error check bits in the N+1th memory element represent at least one of: error correction code (ECC) bits, parity bits, checksum bits, cyclic redundancy check (CRC) bits, or any combination of the foregoing.

5. The memory array of claim 1 further comprising:
a logic unit for recovering faulty parity bits of the N+1th memory element, in response to detecting the faulty parity bits for the N+1th memory element, by performing a bitwise XOR operation on the data bits from each of the N memory elements but not from the one or more error check bits derived from these data bits.

6. The memory array of claim 1, wherein the N uniformly-sized memory elements are used for storing non-redundant data bits simultaneously.

7. The memory array of claim 1, wherein the first logic unit is operable to perform the first bitwise XOR operation by applying a method comprising:
applying XOR operation on a least significant bit (LSB) of the non-redundant data bits of a first memory element of M bits with an LSB of the non-redundant data bits in a second memory element of M bits; and
applying XOR operation on a bit immediately next to the LSB of the of the non-redundant data bits of the first memory element with a bit immediately next to the LSB of the non-redundant data bits of the second memory element,
wherein the first and second memory elements being part of the N uniformly-sized memory elements.

8. The memory array of claim 1, wherein the third logic unit is operable to perform the second bitwise XOR operation by applying a method comprising:
applying XOR operation on a least significant bit (LSB) of the data bits in the remaining N−1 memory element with an LSB of the parity bits stored in the N+1th memory element; and
applying XOR operation on a bit immediately next to the LSB of the data bits in the remaining N−1 memory element with a bit immediately next to the LSB of the parity bits stored in the N+1th memory element.

9. In a memory array, a method of memory error recovery comprising:
storing data bits, and one or more corresponding error check bits derived from the data bits, in N uniformly-sized memory elements, each of the N uniformly-sized memory elements having a memory of M bits for storing non-redundant data bits and one or more corresponding error check (EC) bits derived from the non-redundant data bits, wherein M is an integer and N is an integer greater than one, wherein M is greater than N, and wherein M is an integer multiple of N;
computing, by a first logic unit, parity bits by performing a first bitwise exclusive OR (XOR) operation on each of the non-redundant data bits stored in each of the N uniformly-sized memory elements;
storing, in an N+1th memory element having memory of M bits, the parity bits computed by the first logic unit;
computing one or more EC bits corresponding to the parity bits computed by the first logic unit;
storing, in a portion of the M bits of the N+1th memory element, the one or more EC bits corresponding to the parity bits computed by the first logic unit, the N+1th memory element being a redundant memory element;
detecting faulty bits in the parity bits stored in the portion of the M bits of the N+1th memory element using the one or more EC bits corresponding to the parity bits;
correcting faulty bits in the parity bits;
detecting, by a second logic unit, faulty data bits stored in each of the N uniformly sized memory elements via the corresponding one or more EC bits stored in each of the N uniformly sized memory elements respectively, the detecting to identify whether one of the N uniformly sized memory elements is storing faulty data in its data bits; and
recovering by a third logic unit the faulty data detected by the second logic unit, wherein the recovering performed by performing a second bitwise XOR operation on all the data bits from the remaining N−1 memory elements and with the parity bits stored in the N+1th memory element, the N−1 memory elements having fault free data bits in their corresponding M bits.

10. The method of claim 9, wherein the corresponding one or more error check bits represent at least one of: error correction code (ECC) bits, parity bits, checksum bits, cyclic redundancy check (CRC) bits, or any combination of the foregoing.

11. The method of claim 9, further comprising:
checking the computed parity bits via the one or more error check bits stored in the N+1th memory element to detect one or more errors in the stored computed parity bits.

12. The method of claim 9 further comprising:
computing the one or more error check bits for each of the N memory elements from the M data bits for each memory element.

13. The method of claim 9 further comprising:
recovering faulty parity bits from the N+1th memory element, in response to detecting the faulty parity bits from the N+1th memory element, by performing a bitwise XOR operation on the data bits from each of the N memory elements but not from the one or more error check bits derived from these data bits.

* * * * *